Jan. 22, 1952 B. C. BOOTH 2,583,462

SOUND RECORDING AND REPRODUCING APPARATUS

Filed Oct. 4, 1946 2 SHEETS—SHEET 1

INVENTOR
BYRON C. BOOTH
BY R. G. Richardson
ATTY.

Jan. 22, 1952 B. C. BOOTH 2,583,462

SOUND RECORDING AND REPRODUCING APPARATUS

Filed Oct. 4, 1946 2 SHEETS—SHEET 2

INVENTOR
BYRON C. BOOTH

BY R. G. Richardson

ATTY.

Patented Jan. 22, 1952

2,583,462

UNITED STATES PATENT OFFICE 2,583,462

SOUND RECORDING AND REPRODUCING APPARATUS

Byron C. Booth, Delavan, Wis., assignor to The George W. Borg Corporation, Chicago, Ill., a corporation of Delaware Application October 4, 1946, Serial No. 701,134

4 Claims. (Cl. 242—54)

The present invention relates in general to sound recording and reproducing apparatus, and more in particular to apparatus of this character in which sound is recorded electro-magnetically on a paramagnetic wire or similar medium.

An object of the invention is to produce a new and improved wire reeling mechanism for a sound recording and reproducing apparatus.

A special object is the provision of a simple and compact wire reeling mechanism which makes it possible to build an inexpensive sound recording and reproducing apparatus for use in the home. There is a considerable demand for such an apparatus, adapted for recording and playing back radio programs and for miscellaneous entertainment use such as the recording and playing back of amateur instrumental or voice performances, and the like.

The invention and various features thereof will be described more fully hereinafter with reference to the accompanying drawings, in which—

Figure 1:
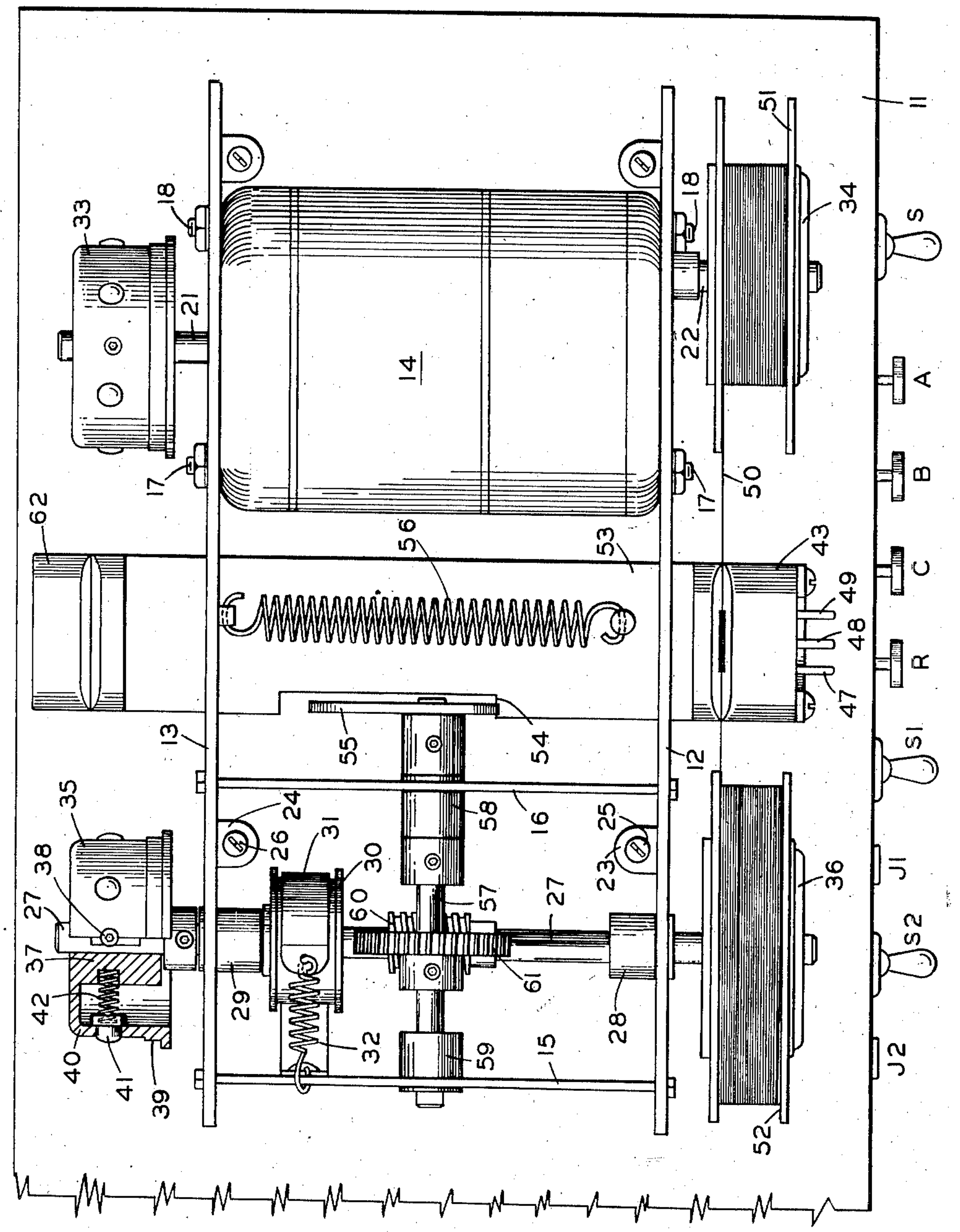
Fig. 1 is a top view of a wire reeling mechanism constructed in accordance with the invention.
Figure 2:
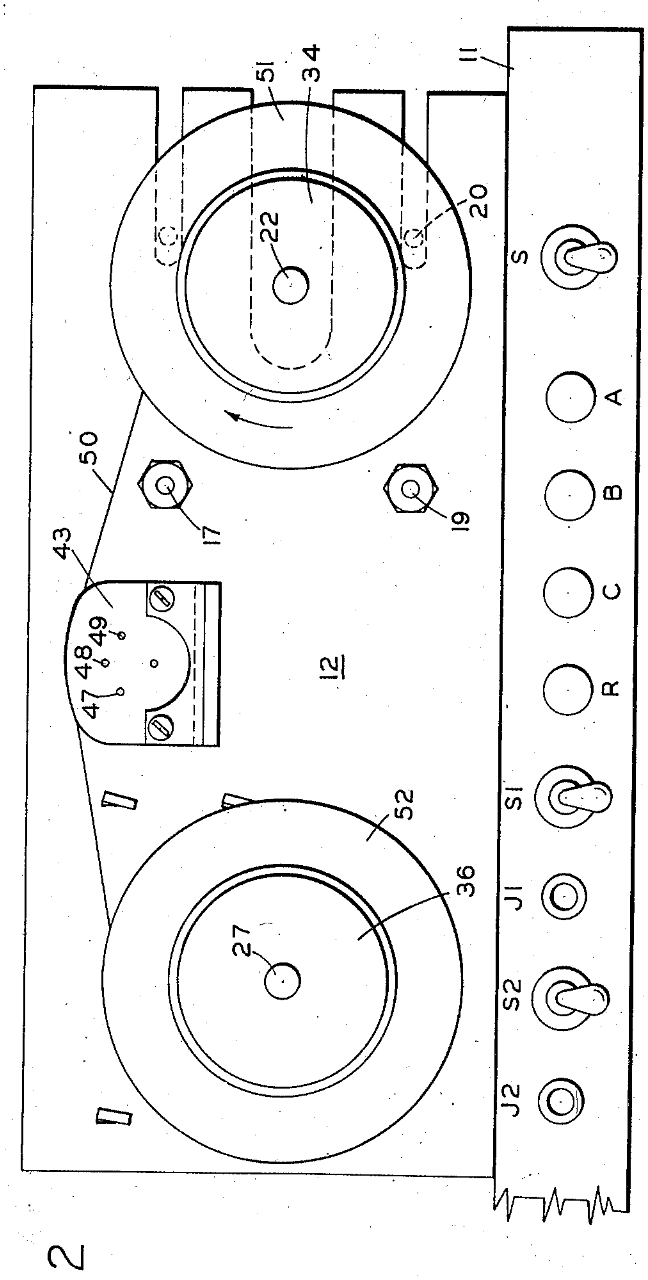
Fig. 2 is a front or plan view of the same.

Referring to the drawings, the various parts of the apparatus are mounted on a hollow base or chassis 11, partly shown in Figs. 1 and 2. The base includes the portion shown in the drawing on which the wire reeling mechanism is mounted, and a portion extending to the left for mounting a loud speaker and the electronic equipment. These parts may be enclosed in a suitable casing according to known practice.

The wire reeling mechanism has a frame comprising the two plates 12 and 13 which are supported in spaced relation to each other by the cross members 15 and 16 and the motor 14. The frame may be secured to the base by means of ears such as 23 and 24, preferably formed integrally with the frame plates, and screws such as 25 and 26.

The motor 14 is secured to the frame plates 12 and 13 by means of the four through bolts 17, 18, 19, and 20, which also function to hold the motor assembly together. The arrangement provides for removal of the motor if it should become necessary, without taking out all of the through bolts. To this end the frame plates are slotted as shown in Fig. 2, so that the motor can be withdrawn from the frame after removing bolts 17 and 19 and loosening the nuts on bolts 18 and 20.

The motor may be a capacitor type motor adapted to run on 60 cycles commercial alternating current. There are two output shafts, running at different speeds. Shaft 21 is the armature shaft and preferably has a speed of 1800 R. P. M. Shaft 22 is connected to shaft 21 by speed reducing gears and may have a speed of 240 R. P. M. The two shafts may rotate in the same direction.

The shaft 27 extends parallel to the motor shafts and is rotatably supported on the frame by means of the two bearing bushings 28 and 29. The reference character 30 indicates a brake drum or spool which is rigidly mounted on shaft 27. The brake band 31 passes around the drum 30 and has its ends attached to the cross member 15. A spring 32 serves to keep the band tight and in frictional engagement with the drum.

The hubs 33 and 34 are rigidly mounted on the motor shafts 21 and 22, respectively. The hubs 35 and 36 are rigidly mounted on shaft 27 in alignment with hubs 33 and 34, respectively. These hubs are all the same and the construction may be explained by reference to hub 35, which is shown partly in section.

The hub 35 includes a central body portion 37 which is bored to fit the shaft 27, to which it is secured by a set screw 38. The remainder of the hub has the shape of a flanged cylinder having a diameter at 39 which provides a removable fit for a wire spool and a somewhat smaller diameter at 40. This part of the hub is provided with a plurality of radially disposed pins such as 41, having rounded ends which project a short distance beyond the cylindrical surface 40 of the hub, being normally held in this position by springs such as 42. When a wire spool is pressed on to the hub the pins such as 41 yield inwardly and by frictional engagement with the interior wall of the spool effectively retain it in position.

The recording head may be of the type developed by the Armour Research Foundation, or any other suitable type. It is enclosed in a housing 43 and comprises a core structure having two small air gaps, an erase coil 44 associated with one air gap and a voice coil 46 associated with the other air gap. There is also a small biasing coil 45 connected in series with the erase coil 44 and associated with the voice coil air gap. These coils are shown in the circuit drawing Fig. 3, and are connected to terminals 47, 48, and 49.

The wire on which the sound is recorded is indicated at 50 and is carried on the spools 51 and 52. These spools are removably mounted on the hubs 34 and 36 and may be referred to as the take up spool and supply spool, respectively. The wire 50 passes from the supply spool 52 into a groove at the top of the recording head and rides over the housing in this groove down on to the take up spool 51. The ends of the wire are secured to the spools in any suitable manner, as by means of leaders such as disclosed in application Ser. No. 678,570, filed June 22, 1946, now Patent No. 2,563,545 dated August 7, 1951.

A level wind mechanism is provided and may now be described. The recording head 43 is mounted on a flat plate or bar 53 which is longitudinally slidable in slots cut in the frame plates 12 and 13. This bar is notched at one side, and has a rounded surface at 54 which is engaged by the heart shaped cam 55. The bar is held against the cam by the spring 56. The cam 55 is rotated by the shaft 57 which is rotatably supported on the cross members 15 and 16 by means of the bearing bushings 58 and 59 and is driven from shaft 27 by the worm 60 and gear 61.

A dummy recording head 62 is mounted on the plate 53 outside the frame, and comprises a grooved block which guides the wire during rewinding, as will presently be explained.

It will be understood that a suitable casing or cover may be provided, although not shown in the drawing. The cover should enclose only the top and ends of the frame and leave the four spool hubs fully exposed.

Figure 3:
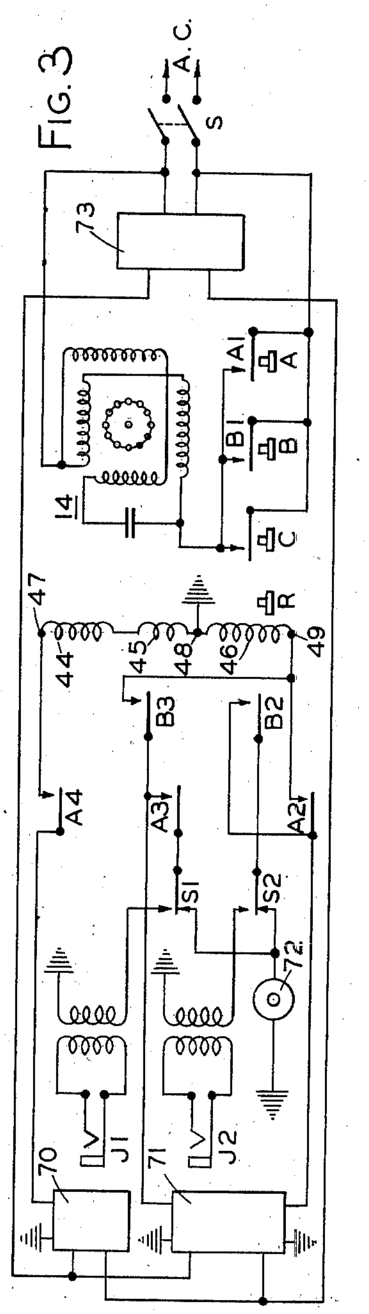
Fig. 3 is a circuit drawing of a sound recording and reproducing apparatus employing the wire reeling mechanism shown in Figs. 1 and 2.

Referring now to Fig. 3, the rectangle 70 represents an oscillator which may be of any suitable type, having an output frequency which is above the audible range. The frequency may be 30,000 cycles per second, for example. An amplifier is represented by the rectangle 71 and also may be of any suitable and known type, adapted to amplify currents of audio frequency. The component parts of the oscillator and amplifier may be mounted on the base 11 in known manner.

The reference character 72 indicates a loud speaker, which may also be mounted on the base along with the oscillator and amplifier parts. As previously mentioned, a suitable casing may be provided to enclose these items of equipment. The loud speaker should be of the dynamic type, capable of operating as a microphone or transmitter.

A number of keys A, B, C, and R are shown in Fig. 3 and also in Figs. 1 and 2. Keys A, B, and C are of the locking type and are mechanically interconnected in such a manner that any key, when operated, will release any key previously actuated. Key R is a release key, adapted to unlock or release any one of the keys A, B, and C.

The rectangle 73 represents a rectifier which is provided to supply direct current to the oscillator 70 and the amplifier 71. Commercial alternating current is supplied to the rectifier and to the motor 14 through the main switch S.

The jacks J1 and J2 are provided to facilitate connecting the recording and reproducing apparatus to a radio receiver. The exact circuit arrangement will depend on the type of radio receiver and at any rate is no part of the invention. It will suffice to say, therefore, that a two conductor cord may be provided, connected to the output of the audio detector stage, and terminating in a plug for insertion in the jack J1. Another cord may be connected to the loud speaker of the receiver and terminate in a plug for insertion in the jack J2. This latter cord is not necessary but makes it possible to use the loud speaker of the radio receiver rather than the loud speaker 72 for reproduction of recorded material, which may be desirable in certain cases. The switches S1 and S2 are used to disconnect the loud speaker 72 and connect the lines extending to the radio receiver in its stead.

The operation of the machine will now be explained. For this purpose it may be assumed that the machine is to be used to record an amateur program consisting of one or more vocal or instrumental numbers and play the record back for the entertainment of the performers and others present. The apparatus may be in the condition in which it is shown, with the bulk of the wire 50 wound on the supply spool 52. The main switch S should be closed, to supply current to the rectifier 73.

Being ready to proceed, the person in charge of the machine, who may be referred to as the "operator," actuates key A, which locks in operated position. At contact A3, key A connects the loud speaker 72 to the input side of the amplifier 71, and at contact A2 key A connects the output of the amplifier to the voice coil 46. At contact A4 key A connects the oscillator 70 to the erase coil 44. These switching operations place the machine in condition for recording.

The operation of key A also closes a circuit for the motor 14, said circuit being completed at contact A1. The motor accordingly starts to run, and rotates the take up spool 51 in a clockwise direction as seen in Fig. 2, whereby the wire 50 is moved past the recording head 43 by winding it on to spool 51 and unwinding it from the supply spool 52. The wire is kept taut by the brake mechanism including drum 30 and brake band 31 which offers the proper resistance to the rotation of spool 52. The level wind mechanism is driven from shaft 27, rotated by spool 52, and the recording head 43 is reciprocated back and forth to distribute the wire uniformly on spool 51.

The program is now going on and is picked up by the loud speaker 72. In moving past the recording head the wire first passes the air gap with which the erase coil 44 is associated and since this coil is now being supplied with high frequency alternating current from the oscillator 70 any existing record on the wire is wiped out. Audio frequency currents generated in the loud speaker 72 are amplified by the amplifier 71 and are transmitted to the voice coil 46, whereby the program is recorded on the wire as it passes the air gap with which the voice coil is associated. These operations are well known and will require no further explanation.

When the program is finished the operator may operate key R, thereby releasing key A and stopping the motor 14.

The operator will now remove the spools 51 and 52 from hubs 34 and 36 and transfer them to hubs 35 and 33, preparatory to rewinding the wire. With a little practice the transfer of the spools can be readily accomplished. For example, the take up spool 51 may be slipped off from hub 34 with the right hand, while using the left hand to guide the wire and keep it taut. This is feasible because spool 52 is held against free rotation by the brake mechanism. After spool 51 is removed from hub 34 it is carried over the top of the machine and placed on hub 35, with the front of the spool to the rear. That is, the spool is rotated 180 degrees about a vertical axis. The supply spool 52 may now be removed from hub 36 and placed on hub 33 in the same manner, still using the left hand to keep the wire taut. Hub 34 may then be rotated to take up the slack in the wire as it is guided into the groove on the dummy recording head 62.

The spools having been transferred, the operator will operate the key C, thereby again closing the circuit of motor 14 and starting the rewinding operation. The supply spool 52 is now rotated at high speed to rewind the wire from the take up spool 51. When the operation has gone far enough the operator will stop the motor 14 by operating key R to release key C.

Before playing back the record the spools 51 and 52 must first be transferred back to their orginal locations on hubs 34 and 36. This transfer is accomplished in the same way as already described, except that the spools are transferred in reverse order, that is, the supply spool 52, which is on the free hub 33, is moved first and the take up spool 51, on the brake controlled hub 35, is moved last. In this way the wire can be kept taut and prevented from loosening up on the spools.

In order to play back the record the operator will actuate the key B, which locks in operated position. At contact B3, key B connects the voice coil 46 to the input side of the amplifier 71 and at contact B2 key B connects the output of the amplifier to the loud speaker 72. Finally, at contact B1 the key B closes the circuit of the motor 14. The wire 50 is now wound from the supply spool 52 on to the take up spool 51, the same as during the recording operation. As the wire passes the recording head audio frequency currents corresponding to the record are generated in the voice coil 46 and are transmitted by the way of the amplifier 71 to the loud speaker 72, where they are translated into sound.

When the reproduction is finished the operator will again stop the machine by operating the release key R. If it is desired to make another record the spools are transferred back to hubs 33 and 35, the wire is rewound, the spools are returned to hubs 34 and 36, all as previously described, and the machine is ready for operations to be resumed.

In the use of the machine as described in the foregoing it is contemplated that the wire will never be wholly unwound from either spool. There may be, for example, nearly one full layer of wire on each spool which is never unwound. The spools are exposed to view and by watching them when the machine is in operation the operator can tell when to stop the motor, by the warning which is given when the body of the spool from which the wire is being wound begins to appear.

In the event that it should be desired to preserve a record, the wire is wound entirely off from one spool on to the other spool, where the end of the wire is secured by means of the leader. This may be done after recording or after play back, but is preferably done after rewinding, so that the record may be put away in condition to be played back without delay whenever it is wanted.

It may be desirable to use the radio loud speaker for the reproduction of a record instead of the loud speaker 72, especially if a very high grade radio receiver is available having a loud speaker which is more efficient or capable of better reproduction than the small dual purpose loud speaker 72. In this case the radio loud speaker is plugged into jack J2 and when reproduction of the record is to begin the switch S2 is operated, as well as the key B. The operation will be apparent without further explanation.

In order to record a radio program the cord connected to the audio detector output stage is plugged in to jack J1. After the program has been tuned in, the key A and the switch S1 are operated and the recording operation will proceed in a manner which will be readily understood, being the same as already described except that the radio receiver is substituted for the loud speaker 72.

The invention having been described, that which is believed to be new and for which the protection of Letters Patent is desired will be pointed out in the appended claims.

I claim:

1. In a reeling mechanism for a wire recorder, two shafts, means for rotating said shafts at different speeds, means for supporting a take up spool on one shaft to wind wire thereon from a supply spool, means for supporting the supply spool on the other shaft to rewind the wire thereto, means including a third shaft on which the supply and take up spools are supported during the winding and rewinding operations, respectively, and a level wind mechanism driven by said third shaft.

2. In a reeling mechanism for a wire recorder, first and second hubs and a common means for rotating them, a take up spool on the first hub to which wire may be wound from a supply spool, a third hub for supporting said supply spool during the winding operation, a fourth hub aligned with said second hub, whereby said wire may be rewound after moving the supply and take up spools to the second and fourth hubs, respectively, a shaft on which said third and fourth hubs are mounted, and a level wind mechanism driven by said shaft.

3. In a reeling mechanism for a wire recorder, a motor having low and high speed output shafts extending from opposite ends thereof, a third shaft supported parallel and in spaced relation to the motor shafts, a hub on said low speed motor shaft, a hub on said high speed motor shaft, two hubs on said third shaft in alignment with said first mentioned hubs, respectively, and means included in each hub for removably securing a wire spool thereto.

4. In a reeling mechanism for a wire recorder, a frame comprising two plates secured together in spaced relation, a motor mounted between said plates, said motor having a low speed shaft projecting through one frame plate and a high speed shaft projecting through the other frame plate, a third shaft extending through said plates parallel to said motor shafts, means for securing wire spools to said motor shafts outside said frame, and means for securing wire spools to said third shaft in alignment with the spools on said motor shafts.

BYRON C. BOOTH.

REFERENCES CITED

The following references are of record in the file of this patent:

UNITED STATES PATENTS

| Number | Name | Date |
|---|---|---|
| 773,985 | Ries | Nov. 1, 1904 |
| 1,123,147 | Sherman | Dec. 29, 1914 |
| 1,326,997 | Uebelmesser | Jan. 6, 1920 |
| 1,457,226 | Magrath | May 29, 1923 |
| 1,724,002 | Brenzenger | Aug. 13, 1929 |
| 1,824,519 | Victor | Sept. 22, 1931 |
| 1,843,650 | Schlicker | Feb. 2, 1932 |
| 2,091,756 | Fodor | Aug. 31, 1937 |
| 2,369,017 | Camras | Feb. 6, 1945 |
| 2,419,476 | Begun | Apr. 22, 1947 |
| 2,457,699 | Marsen | Dec. 28, 1948 |
| 2,481,904 | Camras | Sept. 13, 1949 |
| 2,484,552 | Camras | Oct. 11, 1949 |